(12) United States Patent
Wang et al.

(10) Patent No.: US 11,314,290 B2
(45) Date of Patent: Apr. 26, 2022

(54) TOUCHPAD APPARATUS

(71) Applicants: Maintek Computer (Suzhou) Co., Ltd, JiangSu (CN); PEGATRON CORPORATION, Taipei (TW)

(72) Inventors: Lu Wang, JiangSu (CN); Xue-Bing Cheng, JiangSu (CN); Chun-Yen Huang, Taipei (TW)

(73) Assignees: MAINTEK COMPUTER (SUZHOU) CO., LTD, Jiangsu (CN); PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/071,005

(22) Filed: Oct. 15, 2020

(65) Prior Publication Data

US 2021/0124390 A1    Apr. 29, 2021

(30) Foreign Application Priority Data

Oct. 24, 2019    (CN) .......................... 201911015638.1

(51) Int. Cl.
*G06F 1/16*    (2006.01)

(52) U.S. Cl.
CPC .................................. *G06F 1/169* (2013.01)

(58) Field of Classification Search
CPC .... G06F 1/169; G06F 1/1692; G06F 3/03547; G06F 3/033; G06F 3/0418; G06F 3/0338; H03K 2217/965; H03K 17/965
USPC .................................. 345/156, 168; 361/679
See application file for complete search history.

(56) References Cited

U.S. PATENT DOCUMENTS

| | | | |
|---|---|---|---|
| 8,441,450 B2 * | 5/2013 | Degner | G06F 3/042 345/173 |
| 8,715,438 B2 | 5/2014 | Kessler | |
| 9,417,718 B2 * | 8/2016 | Ishikawa | G06F 3/0338 |
| 10,285,288 B1 * | 5/2019 | Su | H05K 5/0221 |
| 2019/0040906 A1 * | 2/2019 | Buckingham | G06F 3/03547 |
| 2019/0243475 A1 * | 8/2019 | Huang | G06F 3/03547 |
| 2020/0348757 A1 * | 11/2020 | Forest | G06F 1/1626 |
| 2021/0011565 A1 * | 1/2021 | Pai | G06F 3/0338 |

* cited by examiner

*Primary Examiner* — Adrian S Wilson
*Assistant Examiner* — Gage Crum
(74) *Attorney, Agent, or Firm* — McClure, Qualey & Rodack, LLP

(57) ABSTRACT

A touchpad apparatus includes a housing, a movable member, and a touchpad substrate. The housing includes a first stepped portion provided with a plurality of steps. The steps gradually ascend along a rotation direction around an axis. The movable member is disposed on the housing and is configured to rotate relative to the housing around the axis. The movable member includes a first support portion selectively pressing against one of the plurality of steps. The touchpad substrate is configured to press against one end of the movable member away from the housing. By adjusting a distance between the movable member and the touchpad substrate, a pressing stroke of the touchpad is adjusted, so that a touch force is changed.

11 Claims, 5 Drawing Sheets

TOUCHPAD APPARATUS

CROSS-REFERENCE TO RELATED APPLICATION

This application claims priority to China Application Serial Number 201911015638.1, filed Oct. 24, 2019, which is herein incorporated by reference.

BACKGROUND

Technical Field

The present disclosure relates to a touchpad apparatus and, more particular, to a touchpad apparatus capable of regulating a touch feeling.

Description of Related Art

With the electronic era approaching, portable consumer electronic devices with various functions have been continuously developed to meet the convenience and needs of people's life. Among the various electronic devices, notebook computers are the most widely used, and are popular among the public due to the high convenience.

Generally, most notebook computers are equipped with a touchpad apparatus to replace a mouse, allowing users to perform an operation such as input, selection, or the like. As the notebook computers are used more frequently, touchpads are also used for more times. Each user has different adaptability to a pressing feeling of a touchpad. For an office worker who needs to use a computer for a long time, a touch feeling of a touchpad is important.

However, there are some inevitable tolerances in the design and assembly of a touchpad. When a touchpad is actually used, such tolerances may make a touch feeling of the touchpad strong or weak, or even cause the touchpad to be stuck, making the touch feeling of the touchpad difficult to control.

SUMMARY

Accordingly, one objective of the present disclosure is to provide a touchpad apparatus capable of regulating a touch feeling.

To achieve the foregoing objective, a touchpad apparatus according to the present disclosure includes a housing, a movable member, and a touchpad substrate. The housing includes a first stepped portion. The first stepped portion is provided with a plurality of steps. The plurality of steps gradually ascend along a rotation direction around an axis. The movable member is disposed on the housing. The movable member is configured to rotate relative to the housing around the axis. The movable member includes a first support portion. The first support portion selectively presses against one of the plurality of steps. The touchpad substrate is configured to press against one end of the movable member which is away from the housing.

In one or more implementations of the present disclosure, the housing may further include a plurality of limiting grooves. The plurality of limiting grooves may be arranged around the axis. The movable member may further include a limiting post. The limiting post may be selectively engaged with one of the plurality of limiting grooves.

In one or more implementations of the present disclosure, each of the limiting grooves may be provided with an opening. The opening may have two opposite inclined surfaces. A width between the two inclined surfaces may gradually increase towards the touchpad substrate, and a plurality of inclined surfaces of the plurality of openings may be arranged around the axis.

In one or more implementations of the present disclosure, the housing may further include a second stepped portion. The second stepped portion may be disposed along the rotation direction around the axis. The second stepped portion may be provided with a plurality of steps. The plurality of steps of the second stepped portion may gradually ascend along the rotation direction. The movable member may further include a second support portion. The second support portion may selectively press against one of the plurality of steps of the second stepped portion when the movable member rotates along the rotation direction.

In one or more implementations of the present disclosure, in a direction parallel to the axis, a height of the second support portion may be greater than a height of the first support portion.

In one or more implementations of the present disclosure, a highest step in the plurality of steps of the second stepped portion and a highest step in the plurality of steps of the first stepped portion may be respectively located at two sides of the axis and be aligned with each other.

In one or more implementations of the present disclosure, the second stepped portion and the first stepped portion may be disposed around the axis.

In one or more implementations of the present disclosure, the touchpad apparatus may further include a cover and an elastic member. The cover may be coupled with the housing. The cover may include a covering portion. The movable member may be at least partially located between the housing and the covering portion. The elastic member may be disposed between the covering portion and the movable member.

In one or more implementations of the present disclosure, one of the cover and the movable member may include a protruding wall. The protruding wall may protrude toward the other of the cover and the movable member.

In one or more implementations of the present disclosure, the cover may further include a side wall portion. The side wall portion may be connected with an edge of the covering portion, and be engaged with the housing.

In one or more implementations of the present disclosure, the cover may further include a stopping portion. The movable member may further include a stopping post. The stopping portion may be located on a movement path of the stopping post along the rotation of the movable member. The stopping portion may be configured to press against the stopping post.

In one or more implementations of the present disclosure, the movable member may further include a rotary control portion. The rotary control portion may be disposed at one end of the movable member which is away from the touchpad substrate. The housing may be provided with an aperture. The rotary control portion may be exposed from the aperture.

In summary, in the touchpad apparatus of the present disclosure, by adjusting a distance between the movable member and the touchpad substrate, a pressing stroke of the touchpad is adjusted, so that a touch force is changed. In this way, a user may adjust a touch feeling of a touchpad according to personal habits and needs. In addition, adjustment of the distance between the movable member and the touchpad substrate can resolve a problem that the touchpad is stuck or has an uncomfortable pressing feeling due to the design and assembly tolerances or the like.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
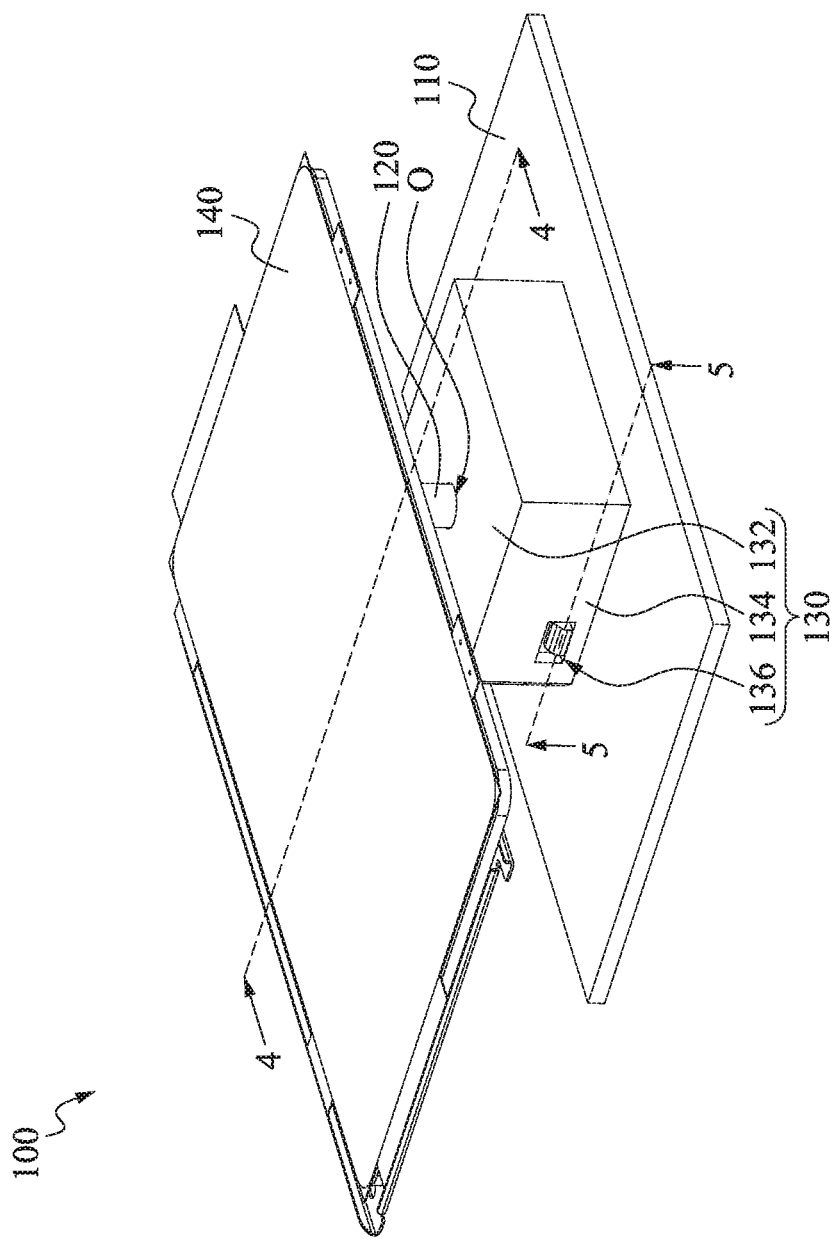
FIG. 1 is a three-dimensional diagram of a touchpad apparatus according to an implementation of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Please refer to FIG. 1. FIG. 1 is a three-dimensional diagram of a touchpad apparatus 100 according to an implementation of the present disclosure. In FIG. 1, the touchpad apparatus 100 includes a housing 110, a movable member 120, a cover 130, and a touchpad substrate 140. The touchpad apparatus 100 of this implementation may be a touch input apparatus for use in a portable electronic apparatus (such as a notebook computer). However, the present disclosure is not limited thereto. In other words, the concept of the touchpad apparatus 100 of the present disclosure may be applied to any electronic product that uses a touchpad module as an input interface.

The cover 130 includes a covering portion 132, a side wall portion 134, and an engagement portion 136. The side wall portion 134 is connected with an edge of the covering portion 132. The engagement portion 136 is disposed on the side wall portion 134. The engagement portion 136 is configured to be engaged with the housing 110. In this implementation, the engagement portion 136 is a through hole. However, the present disclosure is not limited thereto. The through hole runs through the side wall portion 134. The covering portion 132 is provided with an opening O. An end of the movable member 120 passes through the opening O to extend away from the housing 110. The touchpad substrate 140 covers the movable member 120, the cover 130, and the housing 110. The touchpad substrate 140 is configured to press against one end of the movable member 120 which is away from the housing 110.

Figure 2:
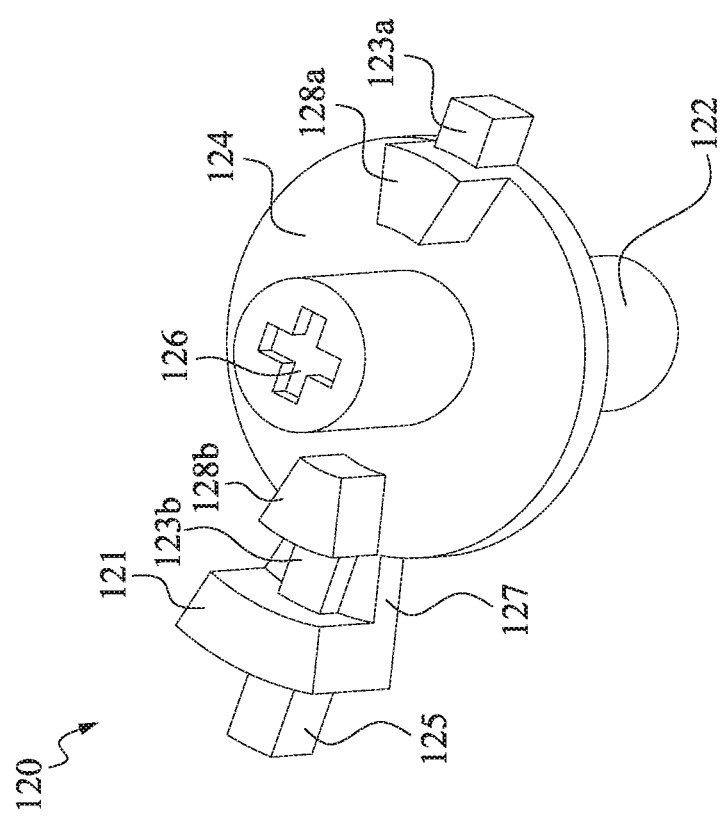
FIG. 2 is a three-dimensional diagram of a movable member in FIG. 1.

Please refer to FIG. 2. FIG. 2 is a three-dimensional diagram of the movable member 120 in FIG. 1. In FIG. 2, the movable member 120 includes a support post 122, a base 124, a rotary control portion 126, two first support portions 128a and 128b, a second support portion 121, two limiting posts 123a and 123b, a stopping post 125, and an extension portion 127. The base 124 surrounds an outer wall of the support post 122. The rotary control portion 126 is located at an end of the support post 122. The rotary control portion 126 is configured to allow a user to regulate rotation of the movable member 120. In this implementation, the rotary control portion 126 is a cross-shaped groove. However, the present disclosure is not limited thereto.

The two first support portions 128a and 128b are symmetrically disposed on the base 124 with the support post 122 as an axis. The two first support portions 128a and 128b protrude relative to the base 124 along an extension direction parallel to the support post 122. The extension portion 127 is connected with an outer edge of the base 124 and extends away from the support post 122. The second support portion 121 is disposed on the extension portion 127. The second support portion 121 protrudes relative to the extension portion 127 along an extension direction parallel to the support post 122, and the two first support portions 128a and 128b have the same extension protruding direction as the second support portion 121. A distance between the second support portion 121 and the support post 122 is greater than a distance between the first support portion 128a/128b and the support post 122. However, the present disclosure is not limited thereto.

The limiting posts 123a and 123b are symmetrically disposed on the base 124 with the support post 122 as an axis. Further, the limiting post 123b is disposed on the extension portion 127, and is located between the first support portion 128b and the second support portion 121. The limiting posts 123a and 123b are configured to be engaged with a limiting groove 116 of the housing 110 (in FIG. 5). The stopping post 125 is connected with an outer edge of the extension portion 127. Specifically, the first support portion 128b, the limiting post 123b, the second support portion 121, and the stopping post 125 are arranged on the base 124 in sequence. However, the present disclosure is not limited thereto.

In some implementations, number and positions of the first support portion 128a and 128b, the limiting posts 123a and 123b, and the second support portions 121 may be flexibly adjusted according to an actual operating condition. However, the present disclosure is not limited thereto.

Figure 3:
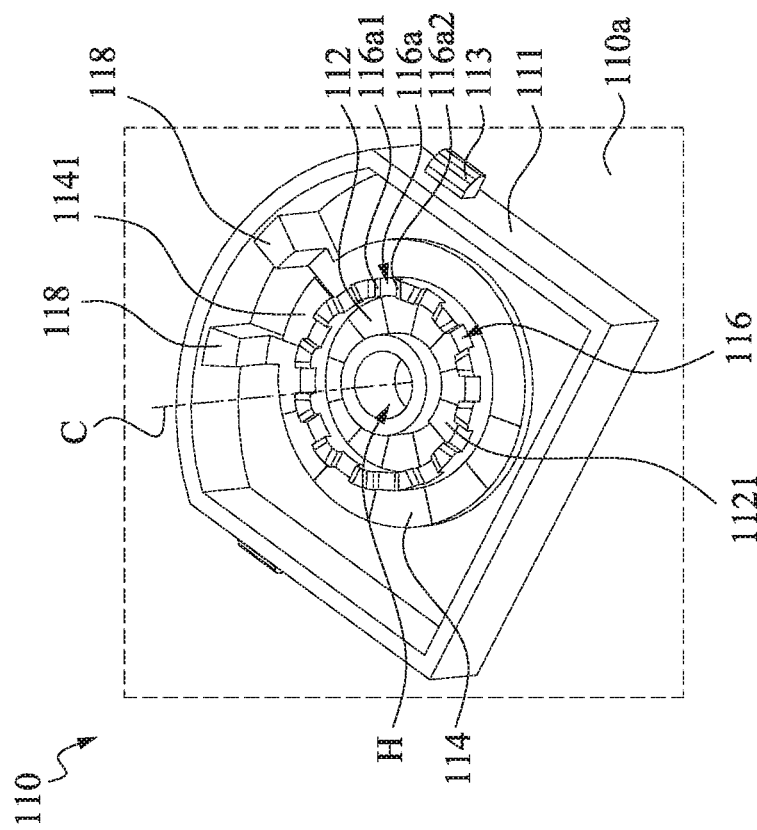
FIG. 3 is a partial three-dimensional diagram of a housing in FIG. 1.

Please refer to FIG. 3. FIG. 3 is a partial three-dimensional diagram of the housing 110 in FIG. 1. The housing 110 is provided with an aperture H. The aperture H is configured to expose the rotary control portion 126 of the movable member 120. The housing 110 includes a first stepped portion 112, a second stepped portion 114, a plurality of limiting grooves 116 (only one is shown in FIG. 3), a stopping portion 118, a wall portion 111, and a fastening portion 113. The first stepped portion 112 and the second stepped portion 114 surround the aperture H, and are disposed around an axis C. The first stepped portion 112 and the second stepped portion 114 respectively include a plurality of steps. The steps of the first stepped portion 112 and the second stepped portion 114 gradually ascend along a clockwise rotation direction in FIG. 3, and a highest step 1121 in the steps of the first stepped portion 112 and a highest step 1141 in the steps of the second stepped portion 114 are respectively located at two sides of the axis C. The step 1121 and step 1141 are aligned with each other.

In some implementations, a height difference between any two adjacent steps of the first stepped portion 112 and the second stepped portion 114 is about 0.03 to 0.05 mm. However, the present disclosure is not limited thereto.

The plurality of limiting grooves 116 are disposed around the axis C. Each limiting groove 116 is provided with an opening 116a. The opening 116a includes two inclined surfaces 116a1 and 116a2 that are opposite to each other. A width between the inclined surfaces 116a1 and 116a2 gradually increases along a direction away from a surface 110a of the housing 110 (i.e., close to the touchpad substrate 140). The plurality of inclined surfaces 116a1 and 116a2 of the plurality of openings 116a are arranged around the axis C. Further, in this implementation, the first stepped portion 112, the plurality of limiting grooves 116, and the second stepped portion 114 are sequentially disposed in a radial direction away from the aperture H. In other words, the first stepped portion 112 is closest to the aperture H; the plurality of limiting grooves 116 are second closest to the aperture H; the second stepped portion 114 is farthest away from the aperture H.

In some implementations, the distance between the first stepped portion 112 and the aperture H, the distance between the plurality of limiting grooves 116 and the aperture H, and the distance between the second stepped portion 114 and the aperture H may be flexibly adjusted according to an actual operating condition, and the present disclosure is not limited thereto.

The stopping portion 118 is disposed on a periphery of the second stepped portion 114. The stopping portion 118 is configured to press against the stopping post 125 of the movable member 120. Specifically, the movable member 120 is disposed on the housing 110 (in FIG. 4), and rotates relative to the housing 110 around the axis C. The stopping post 125 also rotates with the movable member 120. The stopping portion 118 is located on a movement path of the stopping post 125 along the rotation of the movable member 120 to block the rotation of the movable member 120 when the movable member 120 rotates to a maximum angle, i.e., when the touchpad apparatus 100 is adjusted to a maximum stroke, thereby preventing the first support portion 128a from suddenly falling to the lowest step from the highest step.

The wall portion 111 surrounds the first stepped portion 112, the plurality of limiting grooves 116, the second stepped portion 114, and the stopping portion 118, and is disposed perpendicular to the surface 110a of the housing 110. The fastening portion 113 is disposed on the wall portion 111. The fastening portion 113 is configured to be engaged with the engagement portion 136 of the cover 130.

In this implementation, the fastening portion 113 protrudes relative to the wall portion 111. In some implementations, the fastening portion 113 is a through hole, and the engagement portion 136 protrudes relative to the side wall portion 134. However, the present disclosure is not limited thereto.

In some implementations, positions and configurations of the fastening portions 113 and the engagement portions 136 may be flexibly adjusted according to an actual operating condition. However, the present disclosure is not limited thereto.

Figure 4:
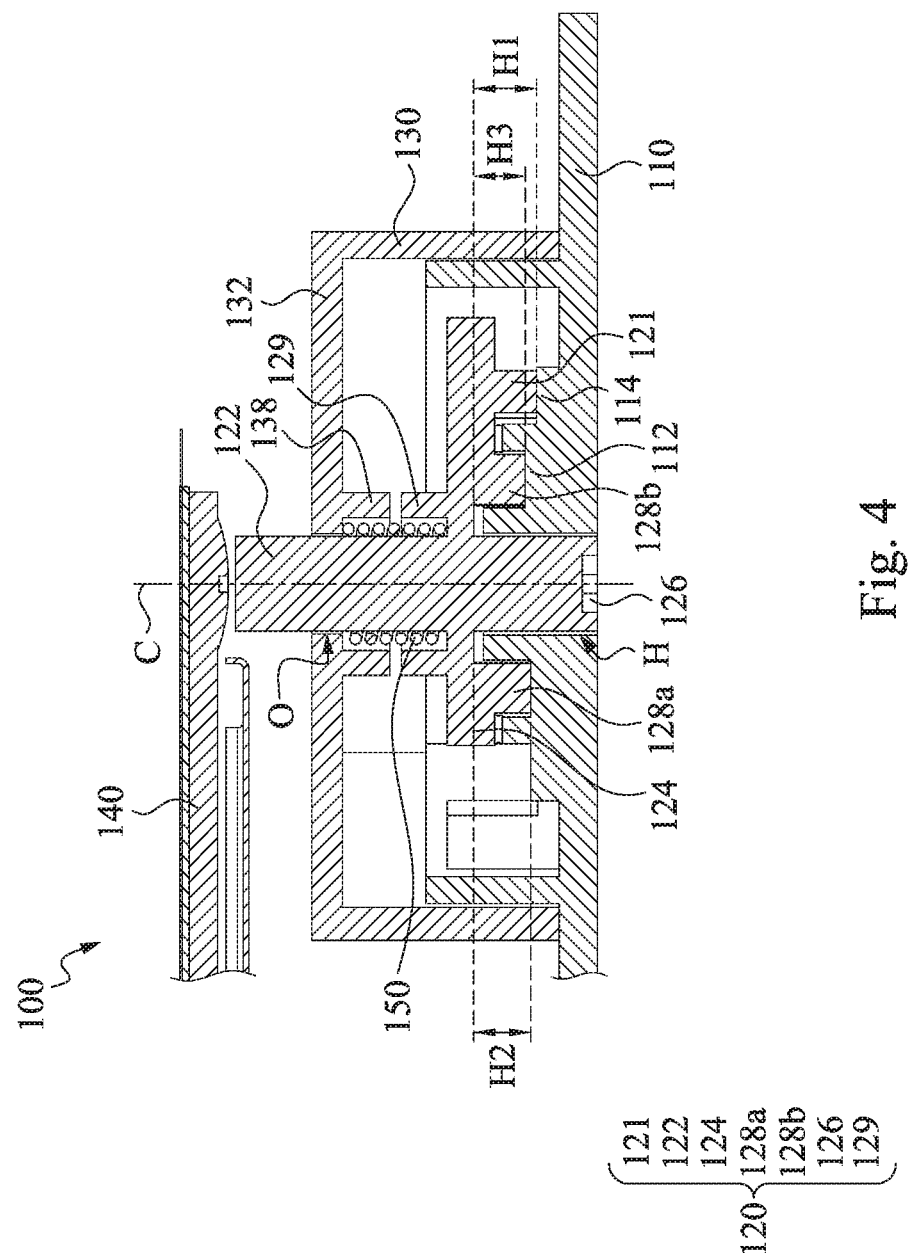
FIG. 4 is a cross-sectional diagram of the touchpad apparatus in FIG. 1 taken along line 4-4.

Please refer to FIG. 4. FIG. 4 is a cross-sectional diagram of the touchpad apparatus 100 in FIG. 1 taken along line 4-4. In FIG. 4, an end of the support post 122 of the movable member 120, at which the rotary control portion 126 is not disposed, extends toward the touchpad substrate 140 through the opening O of the cover 130, and is spaced apart from the touchpad substrate 140. The cover 130 may assist in limiting the support post 122, to prevent the support post 122 from shaking around. An end of support post 122, at which the rotary control portion 126 is disposed, passes through the aperture H of the housing 110, so that the rotary control portion 126 is exposed from the aperture H. In this way, a user may use a cross screwdriver or a flat-blade screwdriver to engage with the rotary control portion 126, so as to adjust the rotation of the movable member 120.

The first support portions 128a and 128b of the movable member 120 selectively press against two steps in the plurality of steps of the first stepped portion 112, respectively. The second support portion 121 of the movable member 120 selectively presses against one of the plurality of steps of the second stepped portion 114. When the movable member 120 rotates relative to the housing 110 around the axis C, the first support portions 128a, 128b and the second support portion 121 may move to press against another adjacent step in the plurality of steps with the rotation of the movable member 120. The movable member 120 moves close to or away from the touchpad substrate 140 due to the heights of the steps of the first stepped portion 112.

First, the first support portion 128b presses against the highest step 1121 in the first stepped portion 112. When the movable member 120 rotates along a direction in which the heights of the steps increase, the first support portion 128a presses against a gradually ascending step of the first stepped portion 112, thereby lifting the movable member 120 in a direction parallel to the axis C, so that a distance between the movable member 120 and the touchpad substrate 140 is decreased. When tapping on the touchpad substrate 140, a user only needs to apply a small force to the touchpad substrate 140, and then the touchpad substrate 140 presses against the support post 122 to trigger a push switch. In this way, a stroke pressed by the user is shorter, and a touch feeling of the user when tapping the touchpad apparatus 100 is also weaker.

On the other hand, when the movable member 120 rotates along a direction in which the heights of the steps decrease, the first support portions 128a and 128b press against a gradually descending step of the first stepped portion 112, and the movable member 120 further descends in the direction parallel to the axis C, so that the distance between the movable member 120 and the touchpad substrate 140 increases. When tapping on the touchpad substrate 140, a user needs to apply a large force to the touchpad substrate 140 to cause the touchpad substrate 140 to press against the support post 122, so as to trigger the push switch. In this way, a stroke pressed by the user is longer, and a touch feeling of the user when tapping the touchpad apparatus 100 is also stronger.

Further, in the direction parallel to the axis C, a height H1 of the second support portion 121 relative to the base 124 is greater than a height H2 of the first support portion 128a relative to the base 124. In addition, the height H2 of the first support portion 128a is greater than a height H3 of the first support portion 128b relative to the base 124. Accordingly, when the movable member 120 rotates, starting from a start position (i.e., a position where the first support portion 128b presses against the highest step 1121 in the first stepped portion 112), along the direction in which the heights of the steps increase, the first support portion 128b moves from the highest step 1121 in the first stepped portion 112 to the lowest step in the first stepped portion 112, thus being in a suspended state. In this case, the second support portion 121 presses against the step of the second stepped portion 114 to help the movable member 120 maintain balance, so that the movable member 120 does not shake around.

The cover 130 further includes a first protruding wall 138. The first protruding wall 138 is disposed at one side of the covering portion 132 facing the housing 110 and extends toward the movable member 120. The movable member 120 further includes a second protruding wall 129. The second protruding wall 129 is disposed at one side of the base 124 facing the covering portion 132 and extends toward the covering portion 132. The first protruding wall 138 of the cover 130 is configured to press against the second protruding wall 129 of the movable member 120. The first protruding wall 138 presses against the second protruding wall 129 to restrict the movement of the movable member 120 in the direction parallel to the axis C, so that the movable member 120 does not get too close to the touchpad substrate 140 to cause the touchpad substrate 140 to be stuck. In addition, during a process of assembling the touchpad apparatus 100, the first protruding wall 138 may further assist positioning the movable member 120, to reduce the assembly time.

In some implementations, one of the first protruding wall 138 and the second protruding wall 129 may be optionally omitted, and the present disclosure is not limited thereto.

The touchpad apparatus 100 further includes an elastic member 150. The elastic member 150 is sleeved on a periphery of the support post 122 of the movable member 120, and is pressed between the covering portion 132 of the cover 130 and the base 124 of the movable member 120. Further, the first protruding wall 138 and the second protruding wall 129 surround the elastic member 150. The elastic member 150 is disposed to push the movable member 120 toward the housing 110 to prevent the movable member 120 from detaching from the housing 110 in the direction parallel to the axis C.

In some implementations, the elastic member 150 is an elastic element such as a spring or a spring sheet, and the present disclosure is not limited thereto.

In some implementations, positions of the first protruding wall 138, the second protruding wall 129 and the elastic member 150 may be flexibly adjusted according to an actual operating condition, and the present disclosure is not limited thereto.

Figure 5:
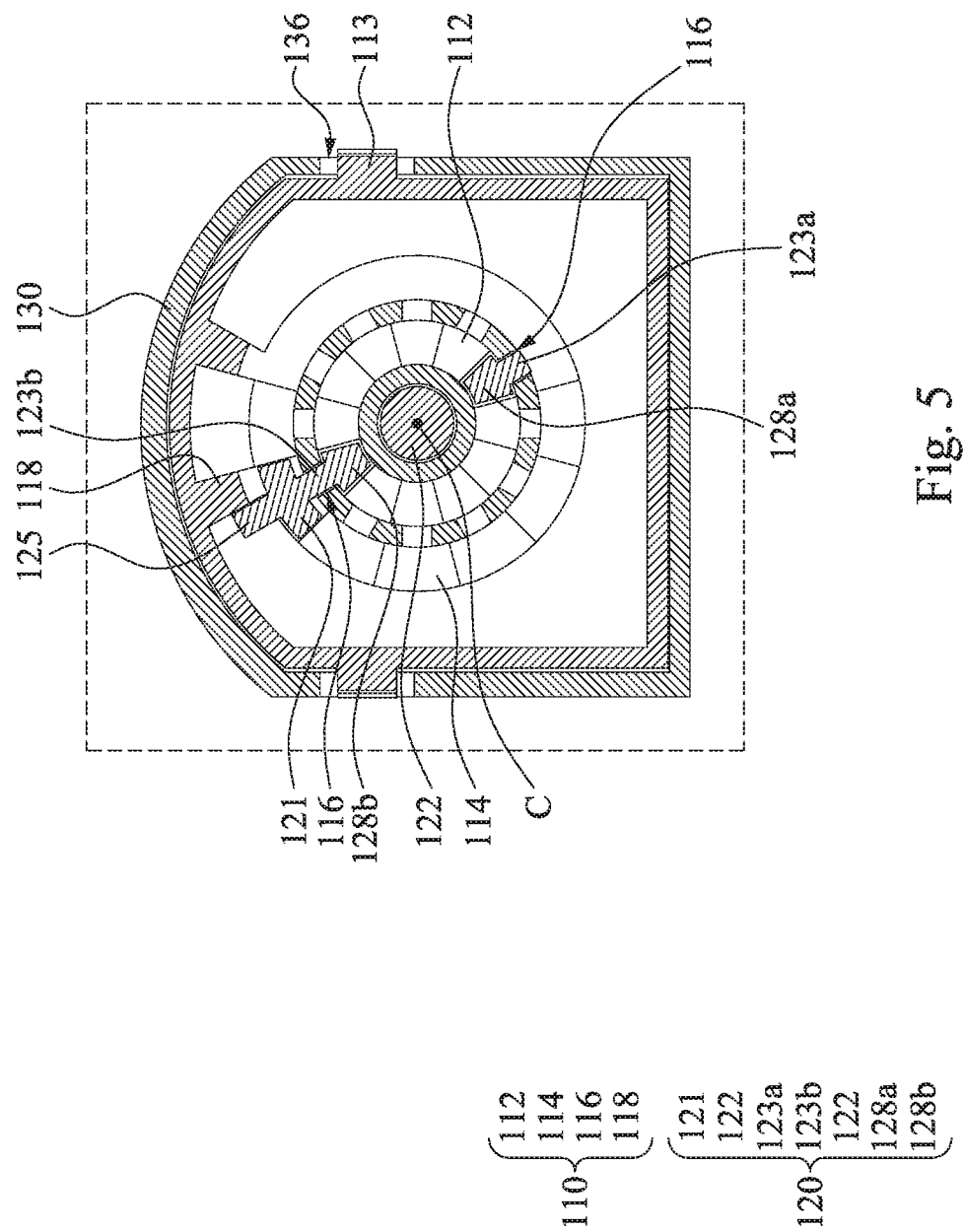
FIG. 5 is a cross-sectional diagram of the touchpad apparatus in FIG. 1 taken along line 5-5.

Please refer to FIG. 5. FIG. 5 is a cross-sectional diagram of the touchpad apparatus 100 in FIG. 1 taken along line 5-5. In FIG. 5, the engagement portion 136 of the cover 130 is engaged with the fastening portion 113 of the housing 110 to allow the cover 130 to be engaged with the housing 110.

The limiting posts 123a and 123b of the movable member 120 are selectively engaged with two of the plurality of limiting grooves 116, respectively. When the movable member 120 rotates relative to the housing 110 to allow the limiting posts 123a and 123b to move to be engaged with another adjacent one of the plurality of limiting grooves 116, the first support portions 128a and 128b move to press against another adjacent one in the plurality of steps of the first stepped portion 112. By the engagement of the limiting posts 123a and 123b with the limiting grooves 116, when rotating relative to the housing 110, the movable member 120 may be selectively positioned at one of a plurality of rotation angles relative to the housing 110. In this way, when a user presses the touchpad substrate 140, the movable member 120 and the housing 110 may be prevented from rotating unexpectedly. Further, the two inclined surfaces 116a1 and 116a2 (refer to FIG. 3) of the opening 116a of the limiting groove 116 assist the limiting posts 123a and 123b in moving along the inclined surfaces 116a1 and 116a2 to another adjacent limiting groove 116 in the plurality of limiting grooves 116.

In addition, in some implementations, an angle between two adjacent limiting grooves 116 ranges from 25 to 30 degrees. However, the present disclosure should not be limited thereto. In this way, every time the movable member 120 rotates 25 to 30 degrees, the movable member 120 is lifted or lowered by about 0.03 to 0.05 mm under the effect of the first stepped portion 112. A pressing stroke between the movable member 120 and the touchpad substrate 140 may increase or decrease by about 0.03 to 0.05 mm. An increase or a decrease in the pressing stroke between the movable member 120 and the touchpad substrate 140 by about 0.03 to 0.05 mm may cause a 30-gram to 50-gram difference of the touch force. However, the present disclosure should not be limited thereto. Accordingly, in the present disclosure, by adjusting a distance between the movable member 120 and the touchpad substrate 140 (i.e., a pressing stroke of the touchpad apparatus 100), the pressing feeling of the touchpad apparatus 100 is adjusted.

In some implementations, one or more limiting posts 123a, 123b may be provided, and the present disclosure should not be limited thereto.

In addition, when the movable member 120 rotates, the stopping post 125 also rotates with the movable member 120. The stopping portion 118 of the housing 110 is disposed on a movement path of the stopping post 125. In FIG. 5, when the stopping post 125 presses against the stopping portion 118, the movable member 120 cannot continue to rotate. In this way, the rotation of movable member 120 may be stopped to prevent the first support portion 128a from suddenly falling from the highest step to the lowest step.

According to the foregoing recitations of the embodiments of the disclosure, it can be seen that in the touchpad apparatus of the present disclosure, by adjusting a distance between the movable member and the touchpad substrate, a pressing stroke of the touchpad is adjusted, so that a touch force is changed. In this way, a user may adjust a touch feeling of a touchpad according to personal habits and needs. In addition, adjustment of the distance between the movable member and the touchpad substrate can resolve a problem that the touchpad is stuck or has an uncomfortable pressing feeling due to the design and assembly tolerances or the like.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A touchpad apparatus, comprising:
   a housing including a first stepped portion provided with a plurality of first steps and a second stepped portion provided with a plurality of second steps, wherein the plurality of first steps gradually ascend along a rotation direction around an axis, the second stepped portion is disposed along the rotation direction around the axis, and the plurality of second steps gradually ascend along the rotation direction;

a movable member disposed on the housing and configured to rotate relative to the housing around the axis, the movable member including a first support portion and a second support portion, the first support portion selectively pressing against one of the plurality of first steps, and the second support portion selectively pressing against one of the plurality of second steps when the movable member rotates along the rotation direction; and a touchpad substrate configured to press against one end of the movable member away from the housing.

2. The touchpad apparatus of claim 1, wherein the housing further comprises a plurality of limiting grooves arranged around the axis, and the movable member further comprises a limiting post selectively engaged with one of the plurality of limiting grooves.

3. The touchpad apparatus of claim 2, wherein each of the plurality of limiting grooves is provided with an opening having two opposite inclined surfaces, a width between the two inclined surfaces gradually increases towards the touchpad substrate, and the plurality of inclined surfaces of the plurality of openings are arranged around the axis.

4. The touchpad apparatus of claim 1, wherein in a direction parallel to the axis, a height of the second support portion is greater than a height of the first support portion.

5. The touchpad apparatus of claim 1, wherein a highest step in the plurality of second steps and a highest step in the plurality of first steps are respectively located at two sides of the axis and are aligned with each other.

6. The touchpad apparatus of claim 1, wherein the second stepped portion and the first stepped portion are disposed around the axis.

7. The touchpad apparatus of claim 1, further comprising:
a cover coupled with the housing and including a covering portion, wherein the movable member is at least partially located between the housing and the covering portion; and
an elastic member disposed between the covering portion and the movable member.

8. The touchpad apparatus of claim 7, wherein one of the cover and the movable member comprises a protruding wall protruding toward the other of the cover and the movable member.

9. The touchpad apparatus of claim 7, wherein the cover further comprises a side wall portion connected with an edge of the covering portion and engaged with the housing.

10. The touchpad apparatus of claim 1, wherein the housing further comprises a stopping portion, the movable member further comprises a stopping post, and the stopping portion is located on a movement path of the stopping post along the rotation of the movable member and is configured to press against the stopping post.

11. The touchpad apparatus of claim 1, wherein the movable member further comprises a rotary control portion disposed at one end of the movable member away from the touchpad substrate, the housing is provided with an aperture, and the rotary control portion is exposed from the aperture.

* * * * *